United States Patent [19]

Eisinger

[11] Patent Number: 5,116,940
[45] Date of Patent: May 26, 1992

[54] PROCESS FOR RECYCLING INERT PARTICULATE MATERIALS

[75] Inventor: Ronald S. Eisinger, Charleston, W. Va.

[73] Assignee: Union Carbide Chemicals & Plastics Technology Corporation, Danbury, Conn.

[21] Appl. No.: 785,055

[22] Filed: Oct. 30, 1991

[51] Int. Cl.$^5$ .............................................. C08F 2/34
[52] U.S. Cl. ...................................... 528/483; 526/67
[58] Field of Search ........................... 528/483; 526/67

[56] References Cited

U.S. PATENT DOCUMENTS 4,740,550  4/1988  Shell .
4,994,534  2/1991  Rhee et al. ............................ 526/88

Primary Examiner—Joseph L. Schofer
Assistant Examiner—David Wu
Attorney, Agent, or Firm—Clement J. Vicari

[57] ABSTRACT

Process for recycling inert particulate materials used in sticky polymer polymerization reactors by discharging the sticky polymer having unbound inert material on its surface into a product hold tank maintained at a lower pressure than the polymerization reactor and thereafter contacting said polymer with a sweep gas and at a velocity sufficient to remove the inert particulate material which is then recycled to the polymerization reactor.

15 Claims, 1 Drawing Sheet

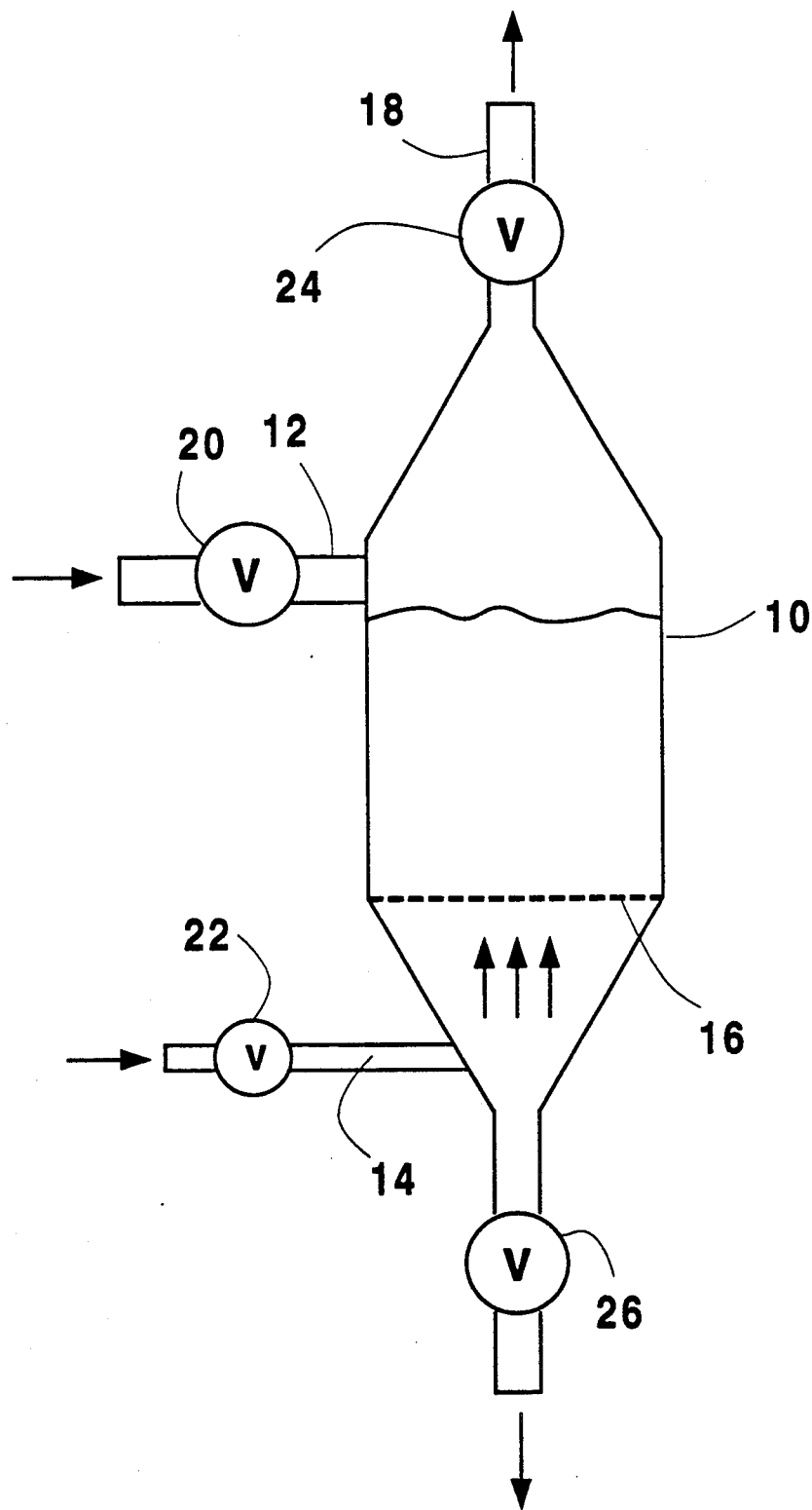

PROCESS FOR RECYCLING INERT PARTICULATE MATERIALS

BACKGROUND OF THE INVENTION

The introduction of high activity Ziegler-Natta catalyst systems has lead to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefin polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

Recently, gas fluidized bed reactors have been utilized to produce so called sticky polymers.

The term "sticky polymer" is defined as a polymer, which, although particulate at temperatures below the sticking or softening temperature, agglomerates at temperatures above the sticking or softening temperature. The term "sticking temperature", which, in the context of this specification, concerns the sticking temperature of particles of polymer in a fluidized bed, is defined as the temperature at which fluidization ceases due to excessive agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into agglomerates of much larger size than the original particles. Polymers of this type show acceptable fluidity in a gas phase fluidized bed reactor; however, once motion ceases, the additional mechanical force provided by refluidizating the polymer by passing the fluidizing gas passing through the distributor plate is insufficient to break up the agglomerates which form and the bed will not refluidize. These polymers are classified as those which have a minimum bin opening for free flow at zero storage time of two feet and a minimum bin opening for free flow at storage times of greater than five minutes of 4 to 8 feet or more.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the resin, it is predominantly governed by the temperature and the crystallinity of the resin. Higher temperatures of the resin increase its stickiness while less crystalline products such as very low density polyethylene (VLDPE), ethylene/propylene polymethylene (EPM), ethylene/propylene diene polymethylene (EPDM) and polypropylene (PP) copolymers usually display a larger tendency to agglomerate to form larger particles.

Because of the stickiness of these resins, the art has been producing these resins at temperatures below the softening temperatures of the polymers. More recently, however, U.S. Pat. No. 4,994,534 discloses a process for producing sticky polymers at polymerization reaction temperatures in excess of the softening temperature of said sticky polymers in a fluidized bed reactor in the presence of a catalyst, which comprises conducting the polymerization reaction above the softening temperatures of the sticky polymers in the presence of about 0.3 to about 80 weight percent, preferably about 5% to about 75% based on the weight of the final product of an inert particulate material having a mean particle size of from about 0.01 to about 10 micrometers or microns.

In effect, these inert particulate materials act as fluidization aids which prevent the sticky polymers from agglomerating and fouling the reactor walls. In order to insure long-term reactor operability, an excess of inert particulate material must be maintained in the reactor. "Excess" means more inert particulate material than will be bonded to the polymer. The concentration of excess inert particulate material on the polymer particles may range from 0.1 to 30 wt %.

As mentioned in the patent, inert particulate materials that might be employed include carbon blacks, silicas, clays and other like materials. The particle size of the inert particulate material ranges from sub-micron to tens of microns.

Extra attention must be paid to the handling of resin leaving the reactor if it contains appreciable amount of free inert particulate material. In particular, processing steps involving mechanical agitation and especially fluidization cause release of the free fine material. Filtration systems requiring blowback must be employed. Upsets requiring opening of the downstream process system will have an adverse environmental impact.

In addition, the free inert particulate material also contains large amounts of adsorbed reaction components. In particular, large quantities of diene monomer, e.g. ethylidene norbornene (ENB) and aluminum alkyl are adsorbed. These materials have an adverse effect (odor, reduced cure) on the product resin. The extra inert particulate material itself may reduce the marketability of the product.

In addition, more inert particulate material, diene monomer, and aluminum alkyl must be added to the reactor to replace that removed with the free inert particulate material. For example when utilizing carbon black, the amount of free carbon black on resin leaving the product discharge tank is frequently about 5 wt %. Typical loadings of diene monomer, e.g. ENB and aluminum alkyl on the carbon black are 2 and 0.5 wt % respectively.

It would therefore be extremely beneficial to provide a process for recycling inert particulate material used in sticky polymer gas phase polymerization reactors.

SUMMARY OF THE INVENTION

Broadly contemplated, the present invention provides a process for recycling inert particulate materials used in sticky polymer gas phase polymerization reactions which comprises (a) producing a sticky polymer in a gas phase polymerization reactor at a pressure of about 200 to 600 lbs/in$^2$ in the presence of an inert particulate material which renders said sticky polymer non-sticky, (b) discharging from said reactor said non-sticky polymer having unbound inert particulate material on its surface, (c) introducing said non-sticky polymer into a product hold tank which is initially maintained at a pressure below the pressure in said reactor, (d) permitting the pressure in said product hold tank to reach reactor pressure, (e) directing a sweep gas into said product hold tank in contact with said non-sticky polymer, said sweep gas being maintained for a time and at a velocity sufficient to remove substantially all of said unbound inert particulate material from said non-sticky polymer, (f) discharging said sweep gas containing substantially all of said unbound inert particulate material from said hold tank and (g) recycling said sweep gas containing said unbound inert particulate material to said polymerization reactor.

The inert particulate material is preferably a carbon black or silica and the sweep gas is preferably an inert gas such as nitrogen, although non-inert gases such as ethylene or clean (e.g. filtered) recycle gas from the reactor or mixtures thereof can also be employed.

BRIEF DESCRIPTION OF THE DRAWINGS

FIG. 1 is a schematic representation of the system for recycling inert particulate material used in sticky polymer gas phase polymerization reactions.

DETAILED DESCRIPTION OF THE INVENTION

The fluidized bed reactor used for producing sticky polymers can be the one described in U.S. Pat. No. 4,558,790. Other types of conventional reactors for the gas phase production of, for example, polyethylene or ethylene copolymers and terpolymers can also be employed. At the start up the bed is usually made up of polyethylene granular resin. During the course of the polymerization, the bed comprises formed polymer particles, growing polymer particles, and catalyst particles fluidized by polymerizable and modifying gaseous components introduced at a velocity sufficient to cause the particles to separate and act as a fluid. The fluidizing gas can be made up of the initial feed, make-up feed, and cycle (recycle) gas, i.e., monomer and, if desired, modifiers and/or an inert carrier gas. A typical cycle gas is comprised of ethylene, nitrogen, hydrogen, propylene, butene, hexene, or diene monomers, either alone or in combination.

Examples of sticky polymers, which can be produced by the process disclosed in U.S. Pat. No. 4,994,534 and which can be treated according to the present invention include ethylene/propylene rubbers and ethylene/propylene/diene termonomer rubbers, high ethylene content propylene/ethylene block copolymers, poly (1-butene) (when produced under certain reaction conditions), very low density (low modulus) polyethylenes i.e., ethylene/butene rubbers or hexene containing terpolymers, ethylene/propylene/ethylidene-norbornene and ethylene/propylene hexadiene terpolymers of low density.

The polymerization process can be carried out in a batch or continuous mode, the latter being preferred.

Characteristic of two types of resins which can be produced in subject process is as follows:

One type of resin is an ethylene/propylene rubber containing 25 to 65 percent, by weight, propylene. This material is sticky to the touch at reactor temperatures of 20° C. to 40° C. and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20.

The inert particulate materials which are preferably employed to render the sticky polymer non-sticky are materials which are chemically inert to the reaction. Examples of inert particulate materials include carbon black, silica, clays and other like materials. Carbon blacks are the preferred materials. The carbon black materials employed preferably have a primary particle size of about 10 to 100 nanometers and an average size of aggregate (primary structure) of about 0.1 to about 10 microns. The specific surface area of the carbon black is about 30 to 1,500 $m^2/gm$ and the carbon black materials display a dibutylphthalate (DBP) absorption of about 80 to about 350 cc/100 grams.

The silicas which can preferably be employed are amorphous silicas having a primary particle size of about 5 to 50 nanometers and an average size of aggregate of about 0.1 to about 10 microns. The average size of agglomerates of silica is about 2 to about 120 microns. The silicas employed have a specific surface area of about 50 to 500 $m^2/gm$ and a dibutylphthalate (DBP) absorption of about 100 to 400 cc/100 grams.

The clays which can preferably be employed according to the present invention have an average particle size of about 0.01 to about 10 microns and a specific surface area of about 3 to 30 $m^2/gm$. They exhibit oil absorption of about 20 to about 100 gms per 100 gms.

The amount of inert particulate material utilized generally depends on the type of material utilized and the type of polymer produced. When utilizing carbon black or silica as the inert material, they can be employed in amounts of about 0.3 to about 70% by weight, preferably about 5% to about 50% based on the weight of the final product produced. When clays are employed as the inert particulate material, the amount can range from about 0.3 to about 80% based on the weight of the final product preferably about 12% to 75% by weight.

The inert particulate materials can be introduced into the reactor at the bottom of the reactor. It is preferred to treat the inert particulate material prior to entry into the reactor to remove traces of moisture and oxygen. This treatment can be accomplished by purging the material with nitrogen gas and heating by conventional procedures.

A fluidized bed reaction system which is particularly suited to production of sticky polymer resin by the practice of the process of the present invention is illustrated in the disclosure of U.S. Pat. No. 4,994,534.

A schematic representation of the system for recycling inert particulate materials used in sticky polymer gas phase polymerization reactions is illustrated in FIG. 1. Thus, referring to FIG. 1, there is indicated a product hold tank 10 into which sticky resins, which have been rendered non sticky by use of an inert particulate material as disclosed in U.S. Pat. No. 4,994,534, are introduced through conduit 12. The non-sticky polymers which are introduced contain an excess of inert particulate material on their surface which can range from about 0.1% to about 20% based on the weight of the polymer. The non sticky polymer can be discharged directly from the gas phase polymerization reactor into product hold tank 10 at the upper portion of tank 10 as shown together with recycle fluid used in the polymerization reaction.

Prior to introduction of the inert particulate material into product hold tank 10, the pressure in tank 10 is below the pressure existing in the polymerization reactor. This lower pressure facilitates the charging of product hold tank 10. Thus, since pressures in the polymerization reactor can range from about 200 to 600 lbs per square inch, the pressure in hold tank 10 would be below the pressure in the polymerization reactor prior to introduction of the inert particulate materials to product hold tank 10.

Product hold tank 10 is preferably conical at the top and bottom and is designed such that the resin flows downward through the tank.

A clean sweep gas, i.e., a gas containing substantially little or no inert particulate material, is introduced into product hold tank 10 through pipe 14 situated near the lower portion of product hold tank 10. The clean sweep gas then passes through distributor plate 16 and is directed countercurrently against the resin.

Distributor plate 16 can be a screen, a slotted plate, a perforated plate, a plate of the bubble cap type, a grid of perforated pipes and the like. The elements of the plate can all be stationary, or the plate can be of the mobile type disclosed in U.S. Pat. No. 3,298,792. Whatever its design, it must diffuse the sweep gas through the particles at the base of the bed to keep them in a fluidized condition. The mobile elements of the plate can be used to dislodge any polymer particles entrapped in or on the plate.

The clean sweep gas which can be employed in the process of the invention is preferably any gas which is inert to the resin being treated and the inert particulate material being removed. The preferred gas is nitrogen although other gases which are not inert such as ethylene or recycle gas from the reactor or mixtures thereof can be employed provided that the gas contains little or no inert particulate material. The clean sweep gas of choice however is nitrogen wherein the nitrogen content is at least about 70% with substantially no oxygen present in the gas.

The clean sweep gas sweeps away the inert particulate material removed from the resin and forms a stream containing sweep gas and inert particulate material which is discharged from product tank 10 through pipe 18 and directed back to the reactor.

The velocity of the clean sweep gas depends on the particular size of the resin being treated and can vary between about 0.3 ft/sec to about 2.0 ft/sec, preferably about 0.5 ft/sec to about 1.5 ft/sec.

The time required to remove the inert particulate material from the resin in product tank 10 can vary depending on the amount of inert particulate material which is to be recovered from the resin, the superficial clean sweep gas velocity, the amount of resin to be treated and the aspect ratio of product tank 10. The aspect ratio is the height of the settled bed of resin divided by the tank diameter.

Aspect ratios of about 1 or less are most effective with values of 1.5 to about 5 being desirable because of economic considerations.

Generally speaking, less than two minutes of fluidization time in product tank 10 is required to remove most of the unbound inert particulate materials from a resin containing up to 33% by weight of unbound inert particulate material.

Hence depending on the conditions of operation, fluidization time can vary between 5 seconds to about 5 minutes. Preferred times are from about 20 seconds to about 2 minutes.

As previously mentioned, prior to introduction of the inert particulate material into product hold tank 10, the pressure in tank 10 is below the pressure existing in the polymerization reactor.

Referring again to FIG. 1, it will be seen that a system of valves are strategically positioned to accomplish among other things the control of pressure in product tank 10. Thus, valve 20 regulates the feed from the reactor, valve 22 the flow of fluidization gas, valve 24 the return of gas and fines to the reactor and valve 26, the discharge of the resin from product tank 10. Prior to start-up, valves 20, 22 and 24 would be in the closed position and valve 26 would be in the open position. At this time, product tank pressure would be substantially below polymerization reactor pressures. To commence the operation, valve 26 would be closed and valve 20 would then be opened. As a result, resin is discharged into product tank 10 due to pressure differences between the polymerization reactor and product tank 10. Valve 20 can then be closed and valve 22 is opened to permit entry of fluidizing gas through distributor plate 16 and in countercurrent contact with the resin. Valve 24 is also opened to permit gas and fines to be returned to a lower-pressure region in the polymerization reactor. When the inert particulate material on the resin is reduced to the required degree, valves 22 and 24 are closed and valve 26 is opened to permit discharge of the resin.

The following Examples will illustrate the present invention.

EXAMPLE 1

Production of EPDM resin with an inert particulate material

An EPDM resin is produced according to the process disclosed in U.S. Pat. No. 4,994,534 using carbon black as the inert particulate material. The carbon black used is N-650, available from Columbian Chemical Co. Inc.. It has a primary particle size of 61 nm, an average size of aggregates of 0.15 microns, a specific surface area of 39 $m^2/g$, and a DBP absorption of 122 $cm^3$/100 g. The concentration of carbon black in the reactor and in the EPDM granular resin is controlled by either controlling the production rate of polymer or the feed rate of the carbon black, or both.

The monomer composition of the polymer is measured by means of Infrared (IR) analysis. The concentration of carbon black in the product is measured by thermogravimetric analysis. Particle size distribution of the product resin is determined by screen analysis.

The reactor is operated to produce EPDM granular resin at the following conditions:
Reactor temperature = 50° C.
Superficial gas velocity = 2.6 ft/sec.
Ethylene partial pressure = 89 psi
$C_3/C_2$ molar ratio in gas = 1.0
$H_2/C_2$ molar ratio in gas = 0.0006
ENB feed rate = 380 $cm^3$/h
Carbon black feed rate = 3700 g/h
Total reactor pressure = 300 psi The EPDM granular resin containing carbon black is produced at a rate of 21 lb/h without encountering any serious reactor operational problems. A typical sample has the following properties:

Propylene content = 42 wt %
ENB incorporation = 3 wt %
Carbon black content = 38.9 wt %
Mooney Viscosity - (large rotor, 125° C., neat polymer) = 68

Particle size distribution:

| Screen | Opening (in.) | Wt % on Screen |
|---|---|---|
| No. 6 | 0.132 | 0.0 |
| 10 | 0.0787 | 0.4 |
| 18 | 0.0394 | 9.6 |
| 35 | 0.0197 | 39.5 |
| 60 | 0.0098 | 23.9 |
| 120 | 0.0049 | 12.9 |
| Pan | | 13.7 |

Average Particle size = 0.021 in.

EXAMPLE 2

This Example demonstrates the removal and recycling of the inert particulate material to the polymerized reactor.

The EPDM resin produced in Example 1 is introduced into a product hold tank such as shown in FIG. 1. Prior to introduction of the EPDM resin, the tank pressure is about 50 lbs/in$^2$, which is substantially below polymerization reactor pressure. Nitrogen is introduced into the product hold tank at a superficial gas velocity of about 1.0 ft/sec. The aspect ratio is 2.0 and the resin is swept for about 1.5 minutes at pressures substantially equal to the polymerization reactor vessel. The gas stream containing the carbon black material swept away from the resin is discharged from the product hold tank and recycled to a lower pressure region of the polymerization reactor. When the recycle of the gas stream is complete, the valves regulating the flow of recycled gas stream, incoming fluidizing gas and the feed from the reactor are closed and the discharge valve is opened permitting the resin to be discharged. The resin is then analyzed and substantially all of the unbound inert particulate material is shown to be removed from the resin.

The following Examples 3-9 illustrate the effects of superficial gas velocity, sweep time, and bed aspect ratio on the removal of unbound inert particulate material.

A series of experiments were conducted to investigate the recovery of unbound carbon black from granular EPDM polymers by means of a fluidization process. The experiments were carried out by fluidizing EPDM polymer containing carbon black in a 6-in-ID Plexiglass ® (registered trademark of Rohm and Haas) column at ambient pressure and temperature. The amount of unbound carbon black contained with the polymer was determined by sieve analysis, in which it was assumed that the unbound particles were those that passed through a No. 200 screen (0.0029 in). The amount of unbound particles removed from the polymer by fluidization was calculated by difference after measuring the amounts of unbound particles before and after fluidization.

EXAMPLES 3-7

Five Examples were conducted to recover carbon black from a granular EPDM polymer containing carbon black by means of fluidization (Examples 3-7 in Table I). The polymer contained 29.3 wt % of unbound carbon black and had an average particle size of 0.021 in. The polymer contained 42 wt % propylene and 3.5 wt % of incorporated ENB (carbon-free basis). There was 47 wt % of carbon black in the granular sample. The bed aspect ratio (height of settled bed of polymer divided by bed ID) for these tests was 1.0.

The results and conditions are shown in Table I below:

TABLE I

| Example | I.U.C.B* wt % | F.U.C.B** wt % | Superficial Gas Velocity ft/sec. | Sweep Time min | Aspect Ratio L/D | % of Unbound Carbon Removed |
|---|---|---|---|---|---|---|
| 3 | 29.3 | 26.2 | 0.57 | 1.0 | 1.0 | 11 |
| 4 | 29.3 | 4.9 | 0.95 | 1.0 | 1.0 | 83 |
| 5 | 29.3 | 1.2 | 0.95 | 2.0 | 1.0 | 96 |
| 6 | 29.3 | 2.7 | 0.57/ 0.95*** | 2.0 | 1.0 | 91 |
| 7 | 29.3 | 0.4 | 0.95/ 0.95/ 1.23*** | 3.0 | 1.0 | 99 |

*Initial Unbound Carbon Black
**Final Unbound Carbon Black
***Polymer was fluidized for 1 minute at each of the superficial gas velocities shown.

The results in Table I show that most of the unbound carbon black was removed from the polymer if the superficial gas velocity was sufficiently high. The percent of unbound material removed equaled or exceeded 83% when superficial gas velocity was 0.95 ft/sec or greater for one or more minutes (Examples 4, 5, 6, and 7). If the fluidization time was two minutes, the percent of unbound material removed exceeded 90% (Examples 5, 6, and 7). If the degree of fluidization is not sufficiently vigorous, then removal of unbound material over a short period of time is not substantial. Thus, in Example 3, use of superficial velocity of 0.57 ft/sec for one minute resulted in removal of only 11% of the unbound carbon black.

EXAMPLES 8 AND 9

Two Examples of removing unbound carbon black from a granular EPDM resin by fluidization were made to examine the effect of bed aspect ratio. The granular material contained 25 wt % of carbon black, of which 1.28 wt % of the total material was unbound. The polymer contained about 43 wt % propylene and about 3.5 wt % of incorporated ENB. The results and conditions are shown in Table II below:

TABLE II

| Example | I.U.C.B.* wt % | F.U.C.B.** wt % | Superficial Gas Velocity ft/sec. | Sweep Time min | Aspect Ratio L/D | % of Unbound Carbon Removed |
|---|---|---|---|---|---|---|
| 8 | 1.28 | 0.05 | 0.95 | 1.0 | 1.0 | 96 |
| 9 | 1.28 | 0.12 | 0.95 | 1.0 | 1.5 | 91 |

*Initial Unbound Carbon Black
**Final Unbound Carbon Black

As seen in Examples 8 and 9 of Table II, removal of unbound particulate material was effective, with percent removal exceeding 90%, at bed aspect ratios of both 1.0 and 1.5 However, removal efficiency was higher, 96%, with the lower bed aspect ratio than with the higher bed aspect ratio (91% removed). A comparison of Examples 8 and 4 shows that removal efficiency is higher when there is less unbound particulate material in the initial polymer.

What is claimed is:

1. A process for recycling inert particulate materials used in sticky polymer gas phase polymerization reactions which comprises (a) producing a sticky polymer in a gas phase polymerization reactor at a pressure of about 200 to 600 lbs/in$^2$ in the presence of an inert particulate material which renders said sticky polymer non-sticky, (b) discharging from said reactor said non-sticky polymer having unbound inert particulate material on its surface, (c) introducing said non-sticky polymer into a product hold tank, which is initially maintained at a pressure below the pressure in said reactor, (d) permitting the pressure in said product hold tank to reach reactor pressure, (e) directing a sweep gas into said product hold tank in contact with said non-sticky polymer, said sweep gas being maintained for a time and at a velocity sufficient to remove substantially all of said unbound inert particulate materials from said non-sticky polymers, (f) discharging said sweep gas containing substantially all of said unbound inert particulate materials from said hold tank and (g) recycling said sweep gas containing said unbound inert particulate material to said polymerization reactor.

2. A process according to claim 1 wherein said inert particulate material is carbon black.

3. A process according to claim 1 wherein said inert particulate material is silica.

4. A process according to claim 1 wherein said inert particulate material is clay.

5. A process according to claim 1 wherein said sweep gas is nitrogen.

6. A process according to claim 1 wherein said sweep gas is ethylene.

7. A process according to claim 1 wherein said sweep gas is filtered cycle gas.

8. A process according to claim 1 wherein said sweep gas is a mixture of nitrogen and ethylene.

9. A process according to claim 1 wherein said sticky polymers are:
   (a) ethylene propylene rubbers;
   (b) ethylene/propylene/diene termonomer rubbers; and
   (c) high ethylene content propylene ethylene block copolymers.

10. A process according to claim 9 wherein said ethylene/propylene/diene termonomers are ethylene/propylene ethylidenenorbornene termonomers.

11. A process according to claim 9 wherein said ethylene/propylene/diene termonomers are ethylene/propylene/hexadiene termonomers.

12. A process according to claim 1 wherein the velocity of said sweep gas is between 0.3 ft/sec to about 2.0 ft/sec.

13. A process according to claim 1 wherein the velocity of said sweep gas is between 0.5 ft/sec to about 1.5 ft/sec.

14. A process according to claim 1 wherein the aspect ratio in said product hold tank is about 1.

15. A process according to claim 1 wherein the aspect ratio in said product hold tank is about 1.5 to about 5.0.

* * * * *